United States Patent
Reese et al.

(10) Patent No.: US 10,343,785 B1
(45) Date of Patent: Jul. 9, 2019

(54) HYBRID ROTARY DRONE AND METHOD OF USE

(71) Applicants: Isaac Reese, Houston, TX (US); Jacob Brazda, Houston, TX (US)

(72) Inventors: Isaac Reese, Houston, TX (US); Jacob Brazda, Houston, TX (US)

( * ) Notice: Subject to any disclaimer, the term of this patent is extended or adjusted under 35 U.S.C. 154(b) by 282 days.

(21) Appl. No.: 15/356,364

(22) Filed: Nov. 18, 2016

(51) Int. Cl.
*B64C 39/02* (2006.01)
*B64D 27/24* (2006.01)
*B64D 27/10* (2006.01)
*B64D 27/02* (2006.01)

(52) U.S. Cl.
CPC ............ *B64D 27/24* (2013.01); *B64C 39/024* (2013.01); *B64D 27/10* (2013.01); *B64C 2201/027* (2013.01); *B64C 2201/042* (2013.01); *B64C 2201/044* (2013.01); *B64C 2201/108* (2013.01); *B64C 2201/165* (2013.01); *B64D 2027/026* (2013.01)

(58) Field of Classification Search
CPC ........ B64C 2201/027; B64C 2201/042; B64C 2201/044; B64C 2201/108; B64C 2201/165; B64D 2027/026
See application file for complete search history.

(56) References Cited

U.S. PATENT DOCUMENTS

| 9,623,978 | B2 * | 4/2017 | Anton | B64D 27/24 |
| 9,751,625 | B2 * | 9/2017 | Phan | B64D 27/02 |
| 9,751,626 | B2 * | 9/2017 | Phan | B64D 27/02 |
| 9,764,837 | B2 * | 9/2017 | Phan | B64D 27/02 |
| 2016/0137304 | A1 * | 5/2016 | Phan | B64D 27/02 244/17.23 |
| 2016/0311544 | A1 * | 10/2016 | Phan | B64D 27/02 |
| 2016/0376005 | A1 * | 12/2016 | Phan | B64D 27/02 244/2 |
| 2017/0066531 | A1 * | 3/2017 | McAdoo | H02K 7/1815 |
| 2018/0022452 | A1 * | 1/2018 | Phan | B64D 27/02 244/17.23 |
| 2018/0237138 | A1 * | 8/2018 | Phan | B64C 39/024 |

* cited by examiner

*Primary Examiner* — Philip J Bonzell
(74) *Attorney, Agent, or Firm* — Eldredge Law Firm, LLC; Richard Eldredge; Beth Felix

(57) ABSTRACT

A hybrid rotary aircraft includes a body having an inner area; a plurality of arms rigidly attached to and extending from the body; a plurality of rotor assemblies pivotally engaged with the plurality of arms; a first gas engine; and a first brushless electric generator rotatably attached to the first gas engine and conductively coupled to each of the brushless electric motors. The plurality of rotor assemblies each having a brushless electric motor; and a rotor blades rotatably attached to the brushless electric motor.

6 Claims, 5 Drawing Sheets

HYBRID ROTARY DRONE AND METHOD OF USE

BACKGROUND

1. Field of the Invention

The present invention relates generally to rotary aircraft, and more specifically, to a hybrid drone and method of use.

2. Description of Related Art

Drones are well known in the art. For example, FIG. 1 depicts an oblique view of a drone 101 having a body 105 with a plurality of rotary assemblies 103 secured thereto. One or more legs 107 extend from the lower portion of the body 105 and are configured to provide landing support. The batteries and control system (not shown) are disposed within body 105 and are configured to power and manipulate the rotor assemblies 103.

One of the problems commonly associated with drone 101 is the weight of the batteries. Specifically, the drone is required to reduce the weight of the battery to provide adequate lift-to-weight ratio for flight. The limited battery size greatly reduces the hours of flight.

Accordingly, although great strides have been made in the area of drones, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
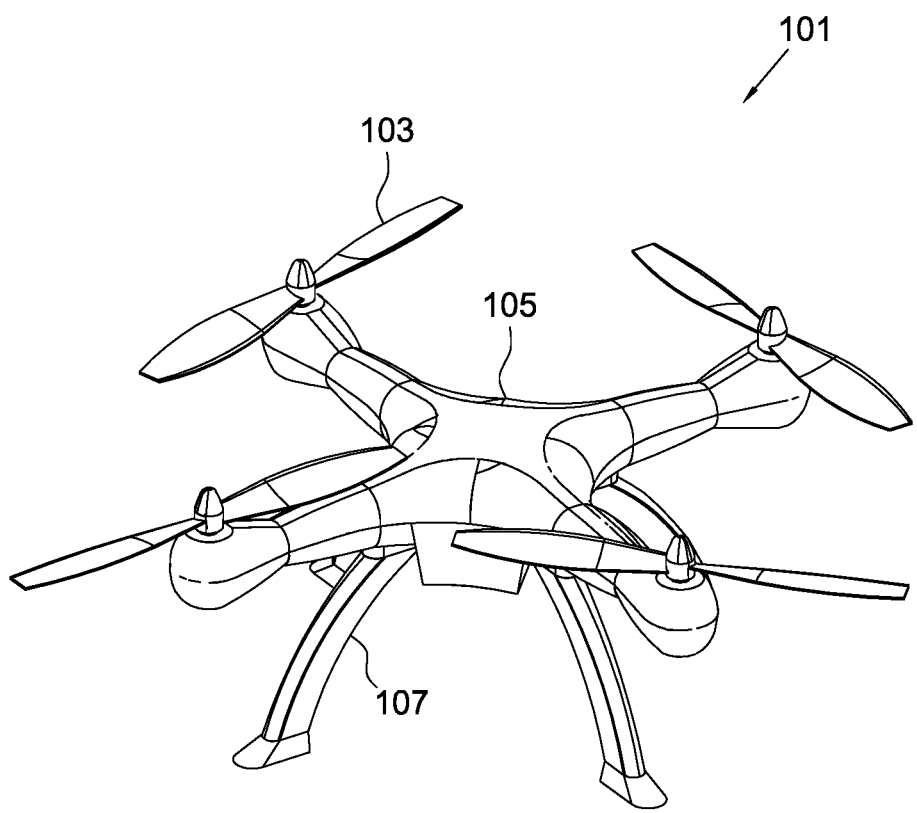
FIG. 1 is an oblique view of a conventional drone.
Figure 2:
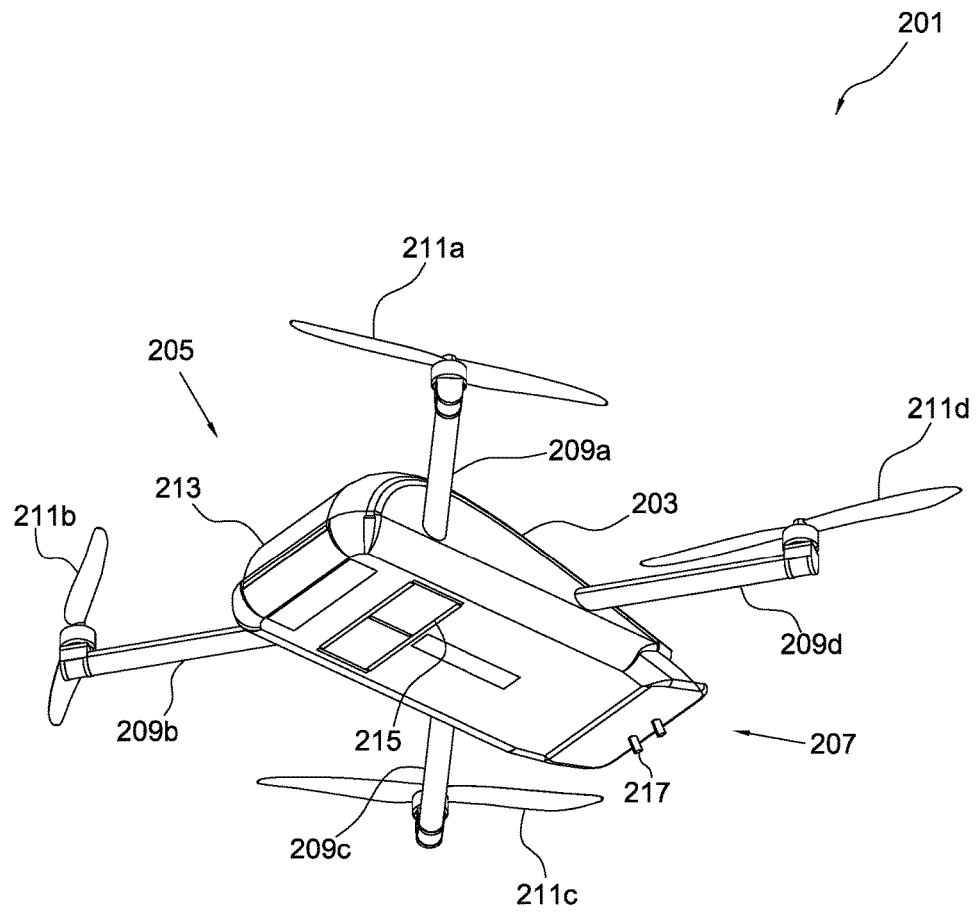
FIG. 2 is a bottom oblique view of a drone in accordance with a preferred embodiment of the present invention.
Figure 3:
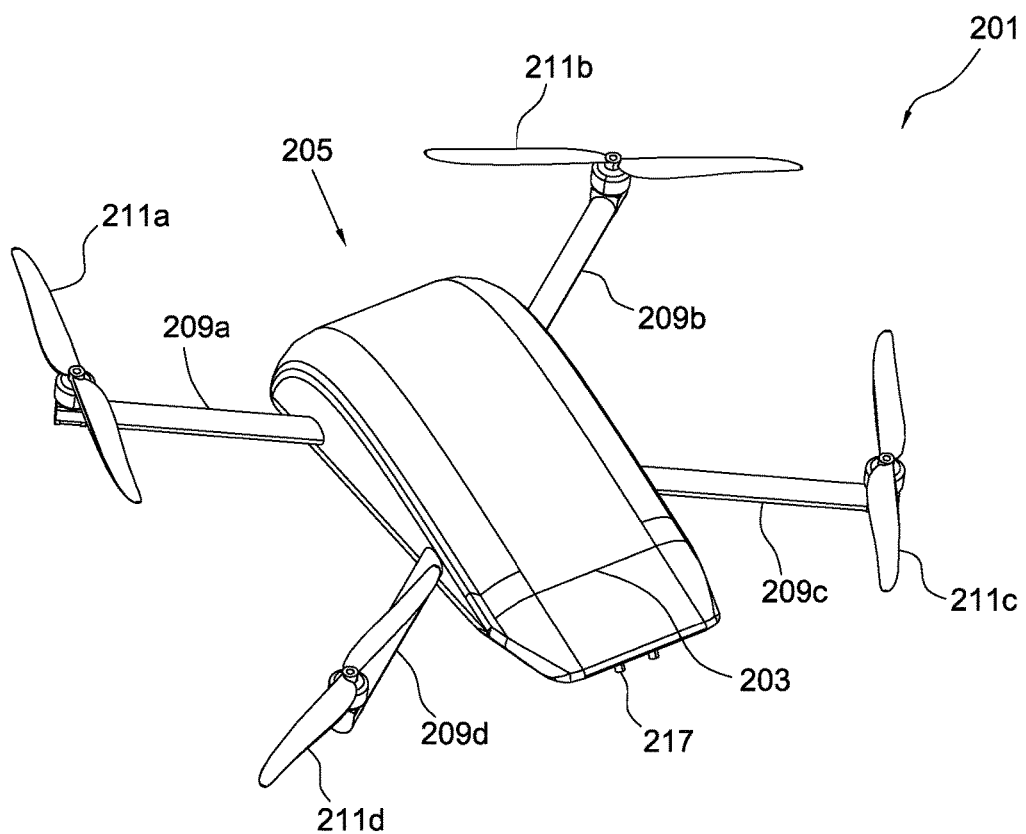
FIG. 3 is a top oblique view of the drone of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional gunpowder systems. Specifically, the present invention includes the feature of providing power to the rotary assemblies via a gas engine and an AC motor. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-5 depict various views of a drone 201 in accordance with a preferred embodiment of the present application. It will be appreciated that drone 201 overcomes one or more of the above- listed problems commonly associated with conventional drones.

In the contemplated embodiment, drone 201 includes one or more of a body 203 with an inner area configured to carry a power assembly 401 therein. The body 203 is preferably contoured with a greater height at front surface 205 and gradually contours downwardly to a back surface. A plurality of arms 209a, 209b, 209c, and 209d rigidly attach to body 203 in a fixed position and are adapted to carry respective rotor assemblies 211a, 211b, 211c, and 211d that provide lift. Each assembly includes DC electric engines configured to rotate a rotor blade.

Figure 4:
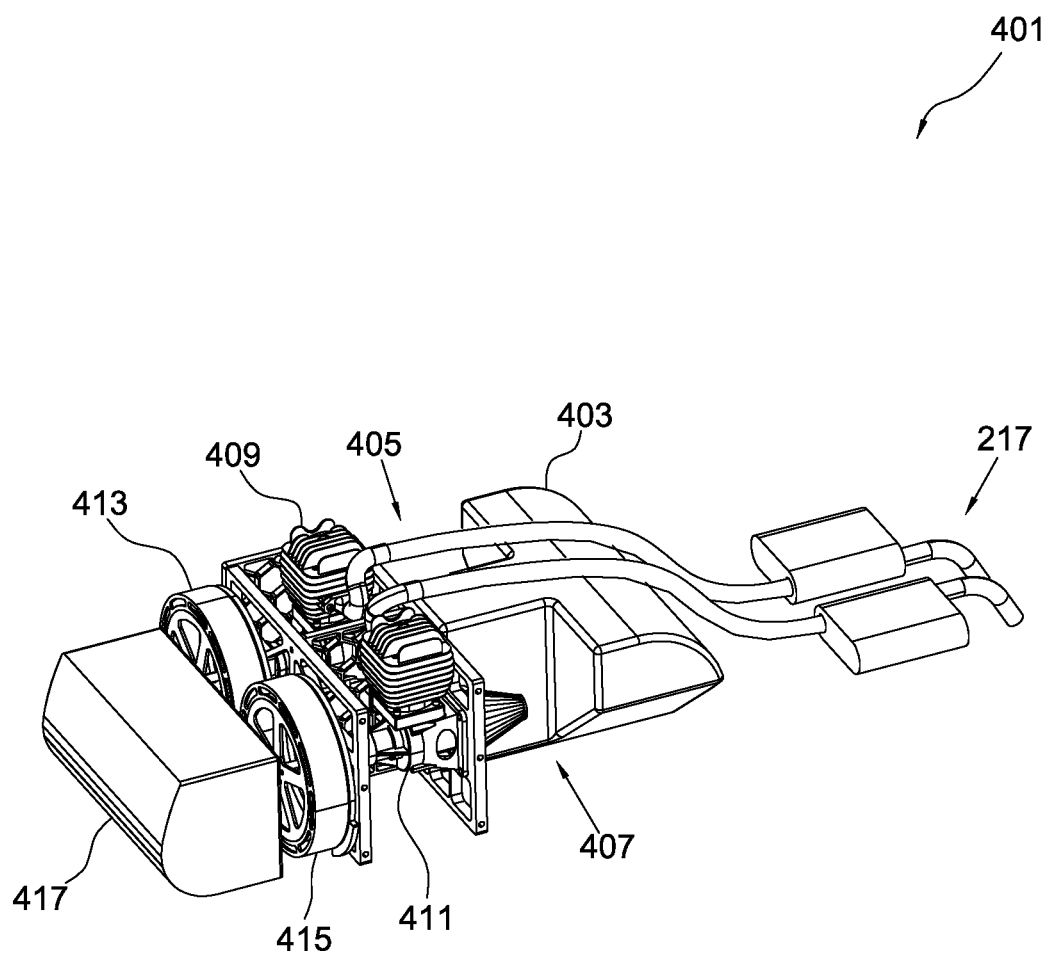
FIG. 4 is an oblique view of the power assembly of the drone of FIG. 1.

Referring specifically to FIG. 4, an oblique view of the power assembly 401 is shown having a frame 403 with openings 405, 407 in gaseous communication with respective exhaust ports of gas engines 409, 411. During use, the exhaust from the engines pass through an exhaust system 217 configured channel the gas to the rear back surface of the body. The gas engines 409, 411 are rigidly attached to frame 403 and rotatably attached to respective AC motors 413, 415 configured to generate electrical power to power the DC motors of the rotor assemblies. A battery 417 is utilized to start the gas engines 409, 411 and to power the computer and electrical components such as the lights of the drone 201.

One of the unique features believed characteristic of the present invention is the reduced size of the battery pack. In lieu of providing electrical power to the DC motor via a battery, the present invention utilizes a gas engine to rotate and to produce power to the rotor assemblies via the AC engines.

Figure 5:
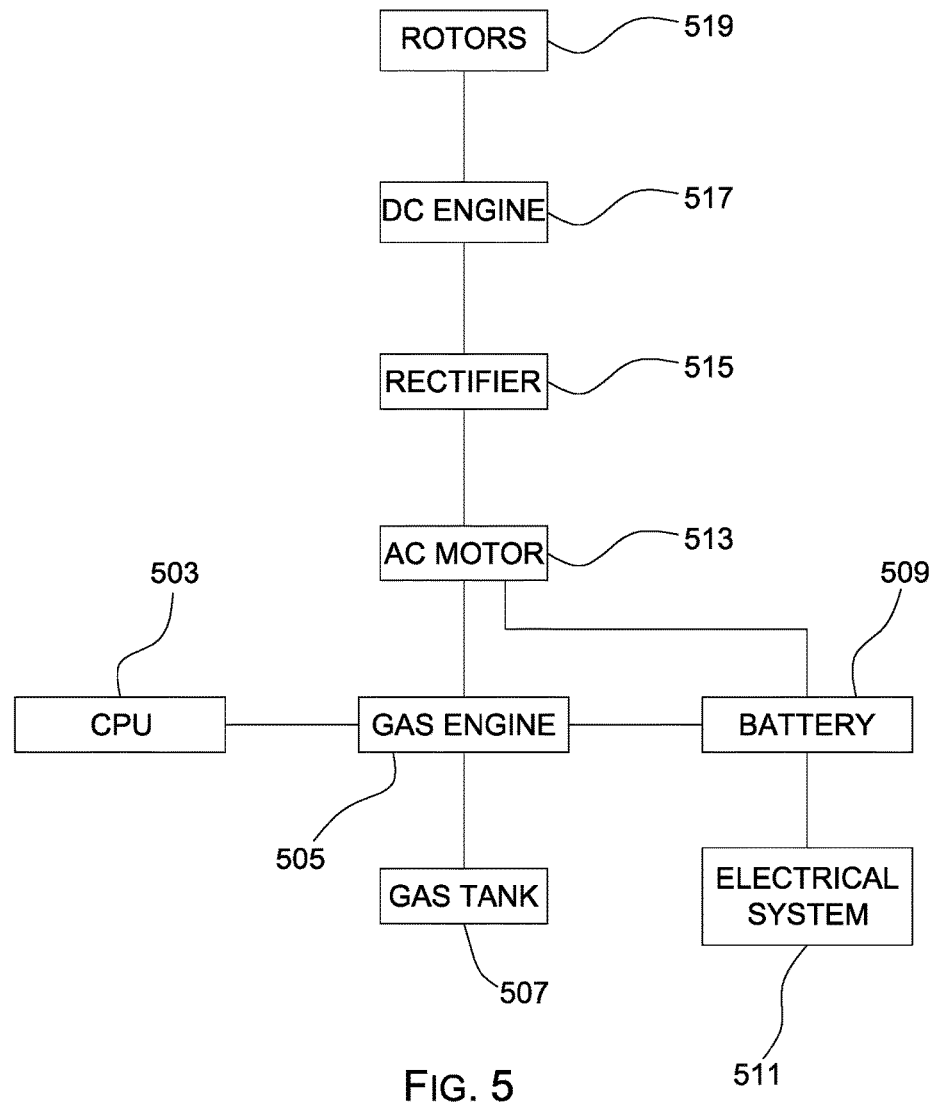
FIG. 5 is a simplified schematic of the components of the drone of FIG. 1.

In FIG. 5, a simplified schematic of the components of drone 201 are shown. A computer 503 is operably associated with the gas engine 505 and the other devices of drone 201. The gas engine 505 is in gaseous communication with a gas tank 507 and conductively coupled to a battery 509, which in turn is conductively coupled to an electrical system 511, e.g., lights, actuators, and the like. The battery could also be conductively coupled to the AC motor 513 in some embodiments to provide power. The gas engine 505 rotates the AC motor 513, which in turn provides electrical power to the DC engine 517 that rotates blades 519. A rectifier 515 is used to convert AC 3-phase electrical energy to DC electrical energy for powering the DC engines 517.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A hybrid rotary aircraft, comprising:
   a body having a contoured top surface extending from a front surface to a back surface such that the front surface has a greater height than the back surface, the body having an inner area;
   a plurality of arms rigidly attached to and extending from the body;
   a plurality of rotor assemblies pivotally engaged with the plurality of arms, the plurality of rotor assemblies each having:
      a brushless electric motor; and
      a rotor blades rotatably attached to the brushless electric motor;
   a power assembly housed within the inner area of the body, the power assembly having:
      a first gas engine;
      a second gas engine;
      a first brushless electric generator rotatably attached to the first gas engine and conductively coupled to each of the brushless electric motors;
      a second brushless electric generator rotatably attached to the second gas engine and conductively coupled to each of the brushless electric motors; and
      one or more exhaust channel extending from the first gas engine and the second gas engine to an exterior of the body at the rear surface of the body;
   wherein the first brushless electric generator and second brushless electric generator generate electrical power to be transferred directly to each of the brushless electric motors without each of the brushless electrical motors receiving power from a battery.

2. The aircraft of claim 1, further comprising:
   a gas tank in fluid communication with the first gas engine and the second gas engine.

3. The aircraft of claim 1, further comprising:
   an onboard computer; and
   a battery conductively coupled to the onboard computer, the first gas engine, and the second gas engine.

4. . The aircraft of claim 3, wherein the battery is solely conductively coupled to the onboard computer, the first gas engine, and the second gas engine.

5. The aircraft of claim 1, further comprising:
   a rectifier conductively coupled to the first brushless electric generator and the brushless electric motor.

6. The aircraft of claim 5, further comprising:
   an electronic speed control conductively coupled to the rectifier and the brushless electric motor.

* * * * *